Oct. 12, 1926.
R. CRAIG
LAST SLICE HOLDER
Filed June 1, 1923
1,602,573
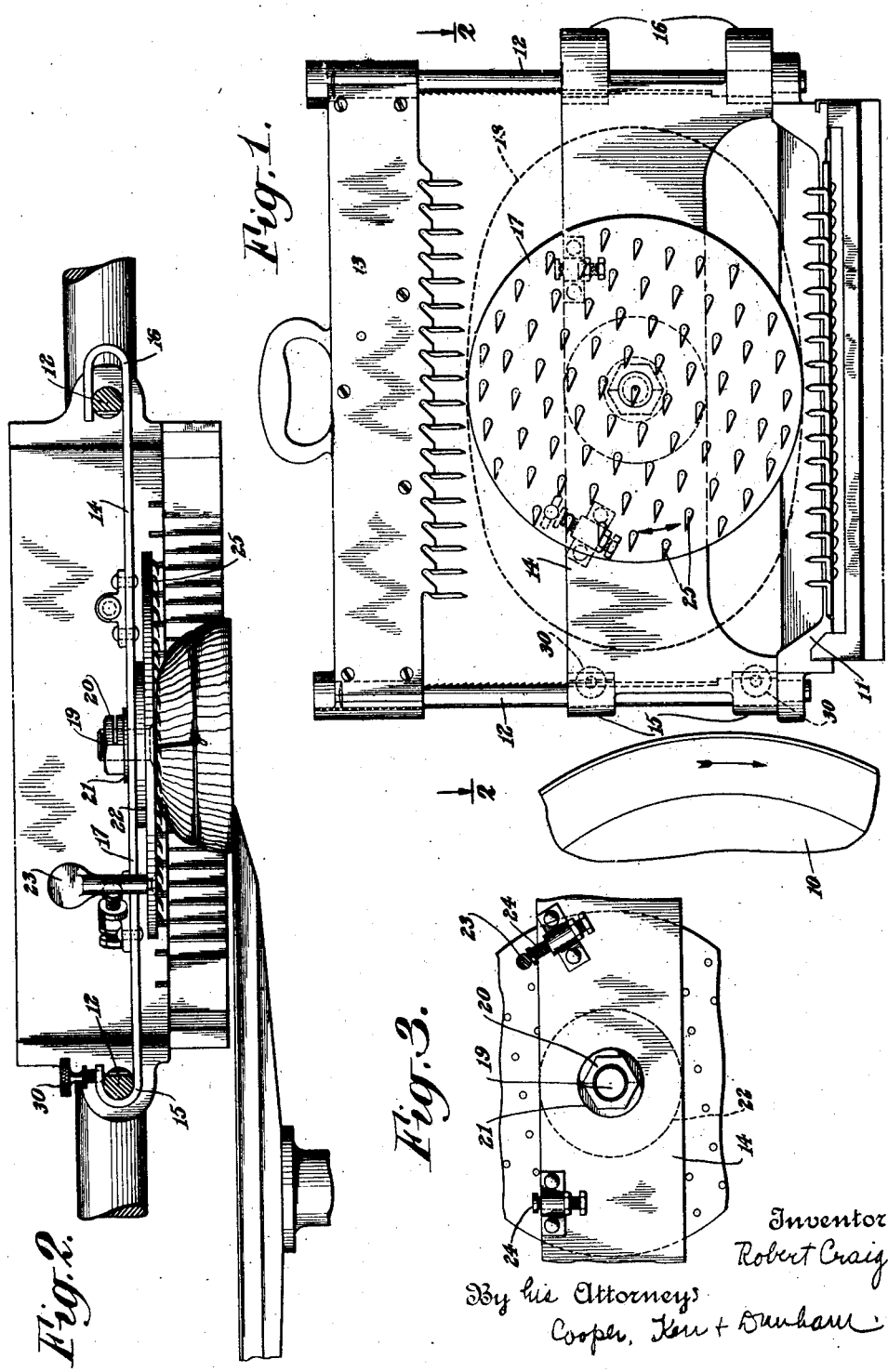
Inventor
Robert Craig
By his Attorneys
Cooper, Kerr + Dunham Patented Oct. 12, 1926.

1,602,573

UNITED STATES PATENT OFFICE.

ROBERT CRAIG, OF DAYTON, OHIO, ASSIGNOR TO DAYTON SCALE COMPANY, OF DAYTON, OHIO, A CORPORATION OF NEW JERSEY.

LAST-SLICE HOLDER.

Application filed June 1, 1923. Serial No. 642,727.

This invention relates to improvements in last slice holder for meat slicing machines. Such holders as heretofore used have comprised a plurality of tines or hooks disposed adjacent a vertical plate. Provisions have been afforded for imparting a movement of the tines relatively to the plate for engaging the meat. Various instrumentalities have been employed for effecting such movement, but all of them have been complicated and expensive. Furthermore, on last slice holders having the relatively movable tines the plates are apertured to permit the tines to pass therethrough and said apertures form pockets in which dirt, grease and fragments of meat collect when the devices are in use. This is very objectionable from a sanitary standpoint.

The present invention has for its object the provision of a last slice holder in which the meat holding tines are rigidly carried by the backing plate, which plate is free from all objectionable apertures.

A further object of the present invention resides in the provision of a last slice holder in which adjustment may be made of the angle of the tines in order to dispose the same at the most efficient angle for securing the meat.

A further object resides in the provision of a last slice holder which may be removed or placed in position upon the supporting posts of a slicing machine without removing the usual meat clamp.

Further objects and advantages will be set forth in more detail in the accompanying specification and claims and shown in the drawings which, by way of illustration, portray a preferred embodiment of the invention.

In the drawings:

Fig. 1 shows a front view of my improved last slice holder.

Fig. 2 shows a top view with the meat clamp shown in Fig. 1 removed.

Fig. 3 is a rear view showing certain of the limiting stops.

In more detail, in Fig. 1, 10 represents a portion of the circular rotating knife, 11 is the meat tray carrying the usual vertical posts 12 which support the usual clamp 13. When it is desired to utilize the last slice holder the clamp is lifted upward to the position shown in Fig. 1.

The last slice holder assembly includes a long plate 14 having looped ends 15 and 16. End 15 is provided with suitable knurled head set screws 30 for engaging the post 12 and securing the last slice holder rigidly upon the posts. The looped end 16 is slightly elongated, which permits the plate to be displaced to the left (from the position shown in Fig. 2) sufficiently to permit the looped end 15 to clear the left hand post 12. Thereafter the plate is swung anti-clockwise about the right hand post 12 and displaced to the right until loop 16 is clear of its post. This construction permits the holder to be placed in position upon the posts or removed therefrom without removing the clamp 13. If the clamp be out of position on the posts the end holder supporting plate may be directly positioned upon the posts by being slid downwardly thereon.

The last slice holder proper comprises a backing plate 17 which may be circular as shown or elliptical as shown by dotted lines 18. In fact, it may be any desired shape which will permit the rocking of the plate. The plate 17 is pivotally supported upon plate 14 by means of a stud 19 preferably staked thereto and threaded to receive a nut 20. Suitable spacing washers 21—22 are provided between nut 20 and plate 14 and between plates 14 and 17.

Plate 17 is provided with a suitable handle 23, and, if desired, limit stop devices 24 may be provided on the supporting plate 14 to contact with the handle stem and limit the extreme position of plate 17 relative to the supporting plate 14.

The meat supporting tines 25 are preferably riveted into plate 17 and all extend in one direction parallel to each other as shown in Fig. 1.

In using the holder, the butt end of the meat is placed on the tines in the manner shown in Fig. 2. Thereafter the operator adjusts the plate 17 so as to direct the tines in a proper direction for effectively securing the meat thereon. In practice it is found that the knife 10, rotating in the direction shown by the arrow, tends to crowd the meat down with respect to the supporting plate. The advance of the plate to present the meat to the knife tends to force the meat to the right as shown in Fig. 1. These vertical and horizontal components of force will vary with different kinds of meat and with different conditions of the cutting edge of the knife. By providing the adjustable mounting for the plate 17, the tines can be directed to the desired angle to the horizontal or vertical for most effectively securing the meat during slicing. Also in applying the meat to the holder the engagement is facilitated if the tines are initially directed upwardly. Afterwards the holder may be swung around to the proper position, which may have been predetermined and set by one of the limit stops.

What I claim is:

1. A last slice holder for a meat slicing machine including a supporting back plate, a plurality of longitudinally extending tines projecting therefrom and extending substantially in the same direction from the supporting back plate and parallel to each other and means for variably adjusting the direction of longitudinal extension of the said tines whereby the meat may be most effectively held during the slicing operation.

2. A last slice holder comprising a supporting member, a back plate having a flat unapertured surface against which the meat abuts, a plurality of tines caried by and projecting therefrom for securing meat ends thereto, said backing plate being disposed to permit the meat carried by the tines to directly abut against it and thus form a rigid vertical support for the meat end and a pivot support for said backing plate on said support member whereby the backing plate may be angularly adjusted with respect thereto.

3. A last slice holder adapted for support upon the posts of a meat tray, having a meat clamp thereon, of a slicing machine, said holder having a pair of looped ends each adapted to extend around the posts of the slicing machine, said looped ends being inwardly open and having provisions permitting the application to or the removal of said holder from said posts by a lateral shifting movement of the said holder and without removing the clamp from the posts.

4. A last slice holder for a meat slicing machine, comprising in combination, a knife a backing plate against which the meat abuts, a plurality of tines fixed thereon and having their shanks parallel to each other and with their tips directed in the same direction, said direction of the shanks of the tines being at an angle to the horizontal with the tips pointing towards said knife in order that the cutting pressure of the knife will force the meat onto said tines.

5. A last slice holder for a slicing machine having a knife and a pair of fixed posts upon which the holder is supported, said holder comprising in combination a member having inwardly open looped ends to engage the posts, said looped ends differing in length and having the shorter loop engaging one post and the longer loop engaging the other post to permit the application to or removal of said holder from the fixed posts by a lateral shifting movement of said holder.

6. A last slice holder for a slicing machine, comprising a supporting member, a backing plate pivotally mounted upon said support and against which the meat is adapted to abut, parallel tines carried by said plate for securing the meat thereto, means for manually displacing the plate and tines pivotally with respect to said supporting member and adjustable stops for limiting the positions of displacement of the backing plate.

7. A last slice holder comprising a backing plate provided with tines and adapted to receive meat thereon which abuts on its rear surface directly against said backing plate, means for displacing said backing plate and tines to one position initially for receiving the meat, said means thereafter being adjustable to permit the tined plate and the meat carried thereby to be displaced to another position for slicing the meat.

8. A last slice holder for slicing machines including a supporting back plate, a plurality of tines projecting therefrom and extending parallel to each other, and means for variably adjusting the direction of the said tines while maintaining a fixed inclination thereof with respect to the supporting back plate and to the meat engaged thereon whereby the meat may be most effectively held during the slicing operation.

9. A last slice holder comprising a smooth and extended back plate, a plurality of tines carried thereon having shanks extending parallel to each other and having their tips directed in the same direction, and means for changing the direction of said shanks of the tines with respect to a horizontal plane perpendicular to said back plate for the purpose described.

In testimony whereof I hereto affix my signature.

ROBERT CRAIG.